No. 699,961. Patented May 13, 1902.
O. P. LANGAN.
TUG STOP.
(Application filed Dec. 9, 1901.)
(No Model.)

Witnesses
Alfred O. Eicker
Frank Turner

Inventor
Oliver P. Langan
by Higdon & Longan Attys

UNITED STATES PATENT OFFICE.

OLIVER P. LANGAN, OF ST. LOUIS, MISSOURI.

TUG-STOP.

SPECIFICATION forming part of Letters Patent No. 699,961, dated May 13, 1902.

Application filed December 9, 1901. Serial No. 85,170. (No model.)

*To all whom it may concern:*

Be it known that I, OLIVER P. LANGAN, of the city of St. Louis, State of Missouri, have invented certain new and useful Improvements in Tug-Stops, of which the following is a full, clear, and exact description, reference being had to the accompanying drawings, forming a part hereof.

This invention relates to shaft-tug stops; and it consists of the novel construction, combination, and arrangement of parts hereinafter shown, described, and claimed.

The object of this invention is to provide a stop for shaft-tugs, consisting of an adjustable ring adapted to be secured over the shaft and carrying a projection against which the shaft-tug engages to prevent it from slipping along the shaft.

Figure 1:
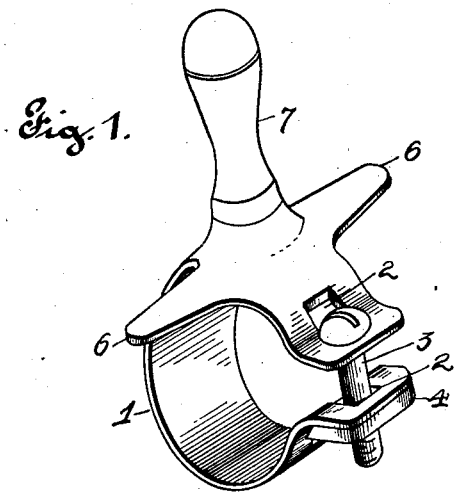
Figure 2:
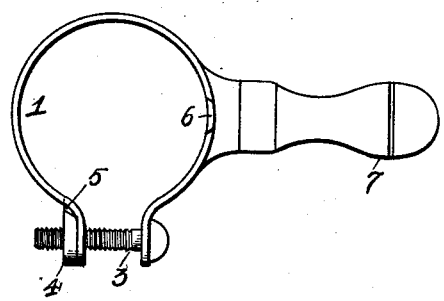
Figure 3:
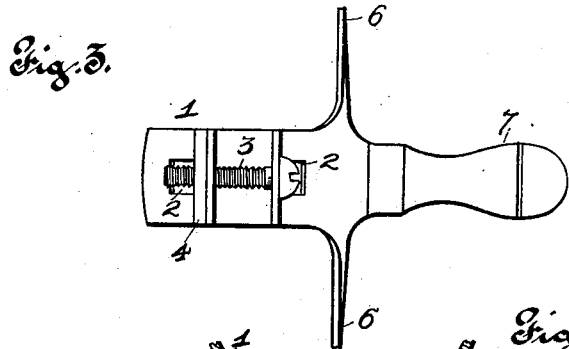
Figure 4:
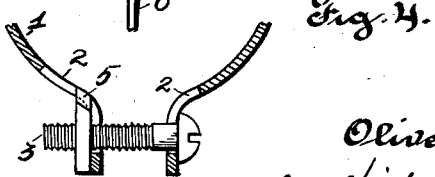

Figure 1 is a perspective view of my complete invention. Fig. 2 is a side view of the same. Fig. 3 is an edge view of the invention. Fig. 4 is an enlarged sectional view of a portion of the tug-stop, showing its fastener.

In the construction of my improved tug-stop I provide a metallic strap or open ring 1, the ends of which are turned parallel to each other, as shown in the drawings. The ends of the strap or ring are provided with slots 2, through which is passed a bolt or screw 3, having on its end a nut 4. Said nut is provided with a lug 5, extending into the slot, preventing said nut from turning. Lateral projections 6 are formed on the outer side of the ring or strap and are for the purpose of fitting snugly against the shaft to hold the device in a rigid position. By such construction the tug-stop may be used on various vehicles, and it may readily be applied in position on ordinary shafts regardless of their size. A projection 7 is rigid with the ring and is intended to extend outwardly and form an obstruction against which the shaft-tug engages to prevent it from slipping over the shaft. The said projection is in such position that when it is extended outwardly on the shaft the parallel ends of the ring or strap are on the under side of the shaft, so that a neat and finished appearance is presented on all visible portions of the shaft.

My improved shaft-tug stop may be applied in position upon shafts of various sizes and may be moved to different positions upon the same shaft, the parallel ends of the strap or ring and screws and nut permitting the device to be adjusted as required. When secured in position by tightening the screw, the device will be very firmly held on the shaft and cannot become loose except by releasing certain of the parts.

I claim—

A shaft-tug stop comprising a metallic strap or ring, the ends of which are turned parallel to each other, and provided with slots; a bolt through said slots to form a clamp; lateral projections extending from opposite sides of the ring as braces; and a projection extending outwardly from the ring and serving as a stop for the tug, substantially as specified.

In testimony whereof I affix my signature in presence of two witnesses.

OLIVER P. LANGAN.

Witnesses:
ALFRED A. EICKS,
M. G. IRION.